United States Patent [19]

Usui et al.

[11] Patent Number: 5,300,179
[45] Date of Patent: Apr. 5, 1994

[54] MAGNETIC DISK MANUFACTURING APPARATUS

[75] Inventors: Mitsunobu Usui; Toshihiro Matsushita, both of Kanagawa, Japan

[73] Assignee: Fuji Photo Film Co., Ltd., Kanagawa, Japan

[21] Appl. No.: 864,620

[22] Filed: Apr. 7, 1992

[30] Foreign Application Priority Data

Apr. 19, 1991 [JP] Japan .................................. 3-115585

[51] Int. Cl.⁵ ............................................ B32B 31/00
[52] U.S. Cl. ................................... 156/381; 156/359; 156/499; 156/556; 156/567
[58] Field of Search ................. 156/86, 359, 381, 382, 156/499, 556, 557, 558, 566, 567

[56] References Cited

U.S. PATENT DOCUMENTS

| | | | |
|---|---|---|---|
| 3,121,039 | 2/1964 | Rowland | 156/381 |
| 3,914,152 | 10/1975 | Amberg et al. | 156/566 |
| 3,959,065 | 5/1976 | Ashcroft | 156/567 |
| 3,967,995 | 7/1976 | Fabianic | 156/86 |
| 4,072,553 | 2/1978 | Braker et al. | 156/86 |
| 4,310,374 | 1/1982 | MacMillan | 156/381 |
| 4,430,142 | 2/1984 | Ochi et al. | 156/567 |
| 4,441,955 | 4/1984 | Richardson et al. | 156/567 |
| 4,496,409 | 1/1985 | Kontz | 156/86 |
| 4,526,646 | 7/1985 | Suzuki et al. | 156/567 |
| 4,579,614 | 4/1986 | Burmeister et al. | 156/86 |
| 4,613,392 | 9/1986 | Klar et al. | 156/556 |
| 4,687,536 | 8/1987 | Hiramatsu et al. | 156/556 |
| 4,960,480 | 10/1990 | Iwamoto | 156/556 |
| 4,960,485 | 10/1990 | Ichinose et al. | 156/567 |
| 5,080,736 | 1/1992 | Matsui | 156/556 |
| 5,156,887 | 10/1992 | Addison et al. | 156/382 |

Primary Examiner—David A. Simmons
Assistant Examiner—William J. Matney, Jr.
Attorney, Agent, or Firm—Sughrue, Mion, Zinn, Macpeak & Seas

[57] ABSTRACT

An apparatus for manufacturing a magnetic disk wherein a center core having an adhesive substance previously applied thereto is adhered to a magnetic sheet. The apparatus includes a holder having a center core retaining member extending therefrom for receiving and retaining the center core, the holder being rotatable such that the retaining member rotates about an orbital path; a core feed station, disposed along the orbital path, to which the center core having the adhesive applied thereto is fed, the center core being received by the retaining member at the core feed station; an adhering station disposed along the orbital path at a position downstream of the core feed station for adhering the center core to the sheet; and an annular housing substantially surrounding the orbital path an through which hot air is circulated so as to partially dry the adhesive applied to the center core. The apparatus further includes a station disposed along the orbital path for supplying center cores having a double-sided adhesive tape applied thereto so that center cores can be alternatively adhered to the sheet using such tape.

15 Claims, 4 Drawing Sheets

MAGNETIC DISK MANUFACTURING APPARATUS

BACKGROUND OF THE INVENTION

The present invention relates to an apparatus for manufacturing a magnetic disk to be rotatably fitted in a cartridge, and more particularly relates to an apparatus for manufacturing a magnetic disk in which an adhesive is applied to the flange of a center core.

FIG. 5 shows a magnetic disk and cartridge unit 1 including a magnetic disk made of a center core 3, which is provided for positioning and chucking purposes, a magnetic sheet 4 adhered to the core, and a cartridge composed of a pair of plates 2 for housing the disk. Such a disc is disclosed in Japanese Unexamined Published Utility Model Application No. 186565/85.

The process of manufacturing the magnetic disk and cartridge unit 1 will be described with reference to FIG. 6. One of the primary steps is an adhering step 5 in which the center core 3 and the magnetic sheet 4 are adhered to each other to form the magnetic disk. Another important step is an assembly step 6 in which the magnetic disk is fitted in the plates 2 of the cartridge. In the adhering step 5, the center core 3, having a flange with an adhesive thereon, is passed through a drier 5b in a direction A of conveyance to partially dry the adhesive, and then magnetically attracted to the attracting portion 8c of an arm of an adhering oscillatory handler 8a. The arm is swung in a direction C to move the center core to a magnetic sheet feed section 9 so that the core is fitted into the circular center hole 4a of the magnetic sheet 4 with the core and the sheet adhered to each other to constitute the magnetic disk 7, which is then conveyed to a prescribed position. The magnetic disk 7 is magnetically attracted to an attracting portion 8d of one of two arms of a double-armed oscillatory handler 8b and then moved to a prescribed accumulating position. The disk 7 is thereafter magnetically attracted to the attracting portion 8e of the other of the arms of the handler 8b. The latter arm is then swung in a direction C so that the disk 7 is sent to the assembly step 6. It should be noted that the latter handler 8b need not be double-armed, but rather may have only one arm.

One of the plates 2 for the cartridge is conveyed to the assembly step 6 in the direction of arrow B in advance of the disk 7. Therefore, the disk 7 is conveyed to a position above the plate 2 by the handler 8b prior to termination of the magnetic attraction of the disk 7 to the attracting portion 8e of the handler 8b so that the disk is placed in the plate. The plate 2 containing the disk 7 is then sent to the next step of the process.

The process in which the adhesive is used to adhere the center core 3 and the magnetic sheet 4 to each other in the above-described manner without using a double-sided adhesive tape has been often adopted in recent years. If the adhesive is a solvent type or emulsion type, it must be subjected to drying after being applied to the center core 3, as described above. Therefore, a drying furnace must be provided for partially drying the adhesive before the core and the magnetic sheet 4 are adhered to each other using the adhesive. If the adhering operation in the step 5 were stopped due to, for example, an assembly operation in step 6, the center core 3 would be caused to remain in the drying furnace for an excessive period of time, resulting in poor adhesion of the adhesive to the magnetic sheet 4 to greatly reduce the adhering strength of the adhesive to the sheet. Also, if the temperature in the furnace is high, the quality of the adhesive would likely change while in the furnace so as to alter the condition and quality of the adherence of the core 3 to the sheet 4. To prevent the condition and quality of adherence of the core 3 to the sheet 4 from being deteriorated due to the presence of the core in the furnace, the magnetic disks 7 can be temporarily stored in the accumulating position.

Since the arms of the oscillatory handlers 8a and 8b are reciprocated and it is necessary to set a time for partially drying the adhesive and control the heating thereof in the furnace, the apparatus for practicing the adhering step 5 and the assembly step 6 has a basic drawback in regard to the inability to increase the speed of the process so as to enhance productivity.

There is also known an apparatus for practicing a process of manufacturing a magnetic disk and cartridge unit with a double-sided adhesive tape, instead of a solution-type adhesive. Since the apparatus does not need to control the temperature of the adhesive by the use of a heating device, the speed of the manufacture can be increased by adopting a rotary assembly section which rotates 360 degrees, rather than oscillating back and forth as the oscillatory handlers 8a and 8b discussed above.

If an apparatus as productive as the above-mentioned apparatus having the rotary assembly section were available to manufacture a magnetic disk and cartridge unit using a solvent type adhesive, productivity could be much improved. However, there are a number of problems in developing such an apparatus. The apparatus having a rotary assembly section includes a plurality of stations such as a center core feed station, a double-sided adhesive tape feed station, an inspection and an adhering station, and a holder which holds the center core. The holder is not only moved up and down but also rotated. If a heating device is provided for each of the stations, there are problems, however, that the adhesive solidifies due to the lack of heat where the holder is stopped, and the apparatus is relatively complicated. If the holder is not of the magnetic attraction type but of the vacuum attraction type, there is a problem that air leaks due to the center core structure making it very difficult to produce a sufficient heating effect. If the entire rotary section of the apparatus is heated, there is a problem in that a very large heating system must be provided, resulting in an apparatus that is uneconomical. For these reasons, the rotary-type apparatus has not been used to manufacture a magnetic disk with a solvent-type adhesive.

Accordingly, it is an object of the present invention to provide an apparatus for manufacturing a magnetic disk and whose use results in as low material cost of the disk as a conventional apparatus for manufacturing a magnetic disk with a solvent-type adhesive and as high productivity as a conventional apparatus for manufacturing a magnetic disk with a double-sided adhesive tape.

SUMMARY OF THE INVENTION

In accordance with the above and other objects, the present invention provides an apparatus for applying an adhesive to the adhering surface of the flange of a center core and attaching the core and a magnetic sheet to each other to manufacture the magnetic disk. The apparatus includes at least a holder supported at the center thereof so that the holder can be rotated about its center to receive and convey the center core, a core feed station provided on the rotational orbit of core retainers provided on the peripheral portion of the holder so as to feed the core, an adhering station provided on the rotation orbit so as to adhere the core and the sheet to each other, and an annular heat keeper which covers the orbited passage of the retainers and through which hot air is circulated to partially dry the adhesive on the center core.

DESCRIPTION OF THE PREFERRED EMBODIMENTS

Preferred embodiment of the present invention is hereafter described with reference to the drawings attached hereto.

Figure 5:
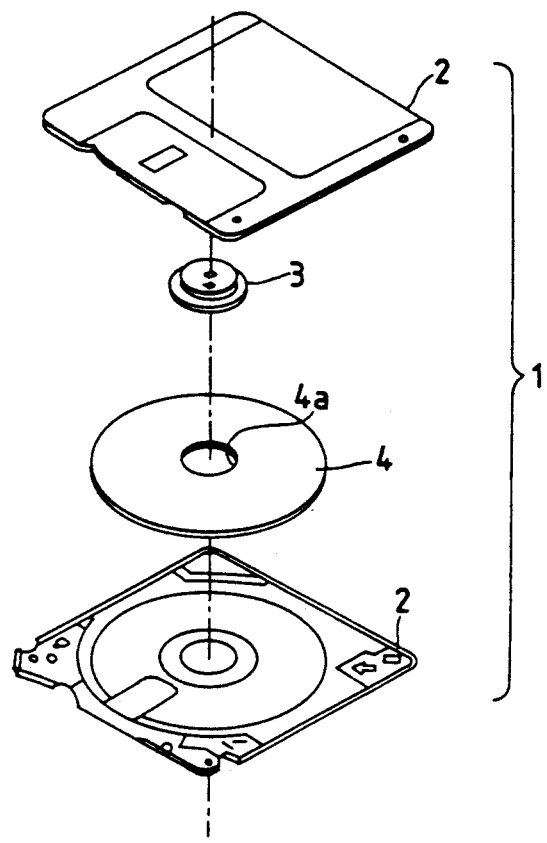
FIG. 5 is an exploded perspective view of a magnetic disk and cartridge unit.
Figure 6:
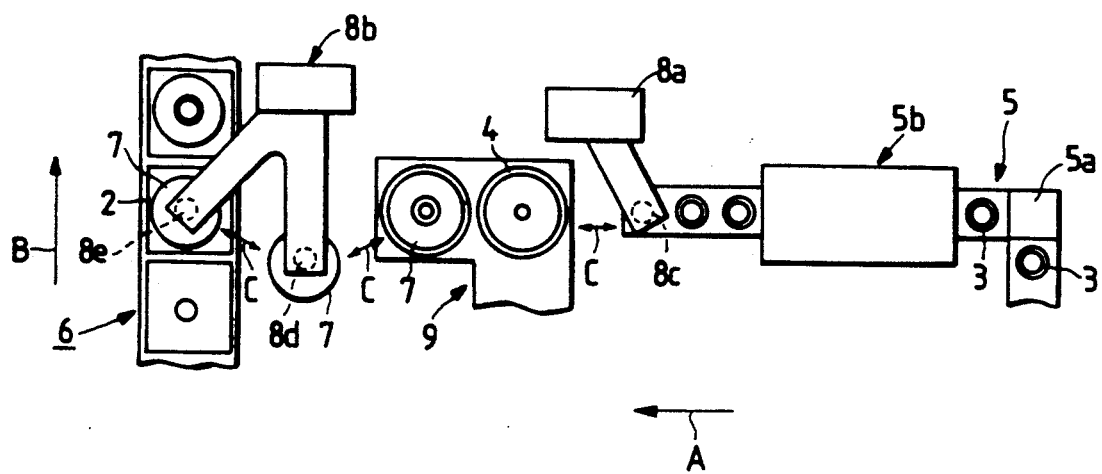
FIG. 6 is a plan view of a conventional apparatus for manufacturing a magnetic core.

The magnetic disk and cartridge unit 1 of the present invention includes a pair of plates 2, with a magnetic disk housed therebetween, similar to the magnetic disk and cartridge unit shown in FIG. 5. The center core 3 of the disk is fitted in the circular center hole 4a of a magnetic sheet 4 having a diameter of 3.5 inches utilizing the apparatus of the present invention so that the core and the sheet are adhered to each other by an adhesive applied to the flange 3a of the core.

Figures 3, 4:
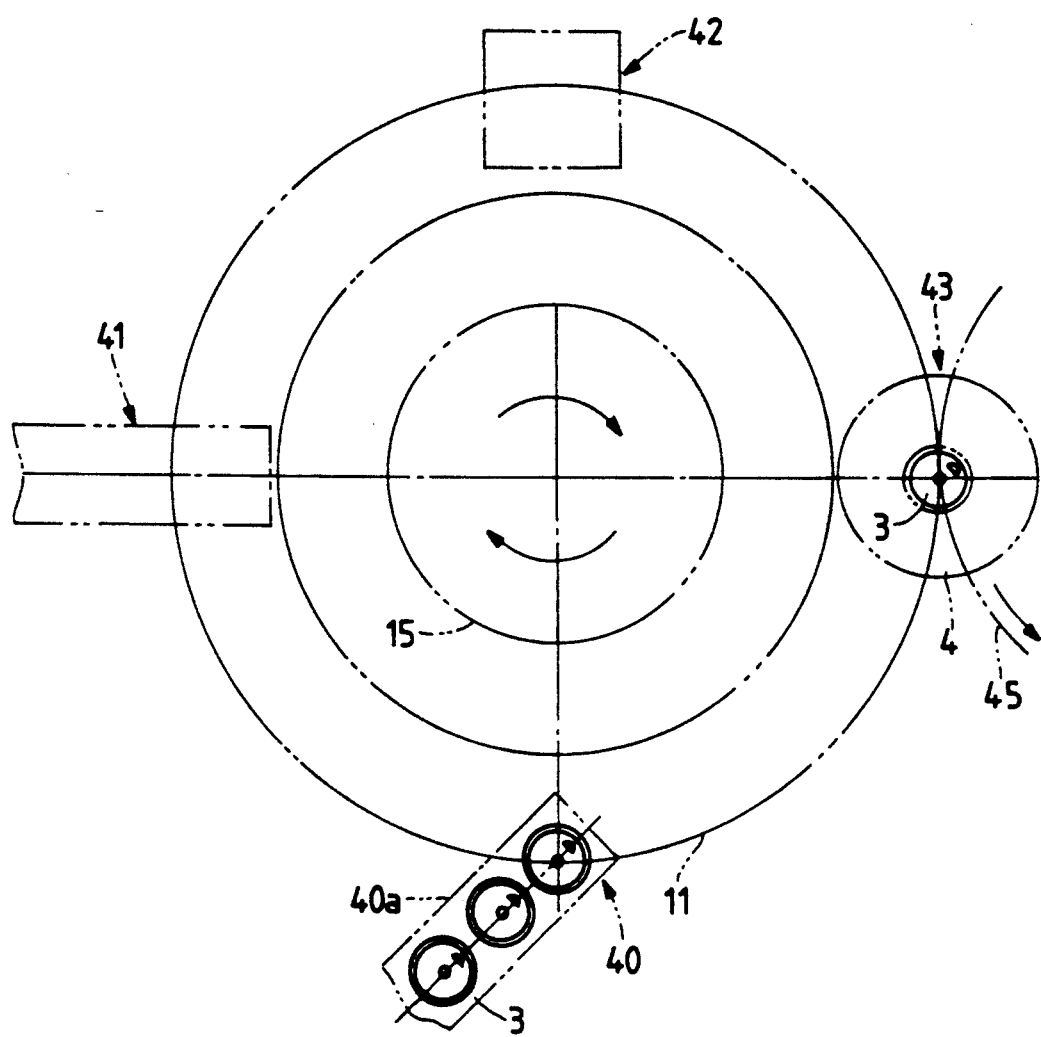
FIG. 3 is a plan view of the apparatus illustrating the positional relationship among the stations of the apparatus.
FIG. 4 is a perspective view of a center core.

The center core 3 is shaped as shown in FIG. 4 and an adhesive 3c is applied to the flange 3a of the core 3. The surface of the adhesive-applied portion of the flange 3a may be either flat or recessed. If the surface is recessed, the center core 3 is rotated to apply the adhesive 3c to the flange a by a dispenser or a screen. The adhesive 3c is an acrylic adhesive which sets at room temperature. The preferred applied quantity of the adhesive 3c is 2 to 6 mg (dry weight). The adhesive 3c applied to the center core 3 is dried for a period of about 40 seconds at a temperature of 80° to 120° C. in a hot air tunnel. Immediately thereafter, the center core 3 is urged onto the magnetic sheet 4 by a force of about 2 to 5 kgf as the non-flange portion 3b of the core is fitted in the circular center hole 4a of the sheet. As a result, the core 3 and the sheet 4 are securely adhered to each other by the adhesive 3c to form the magnetic disk.

Figure 1:
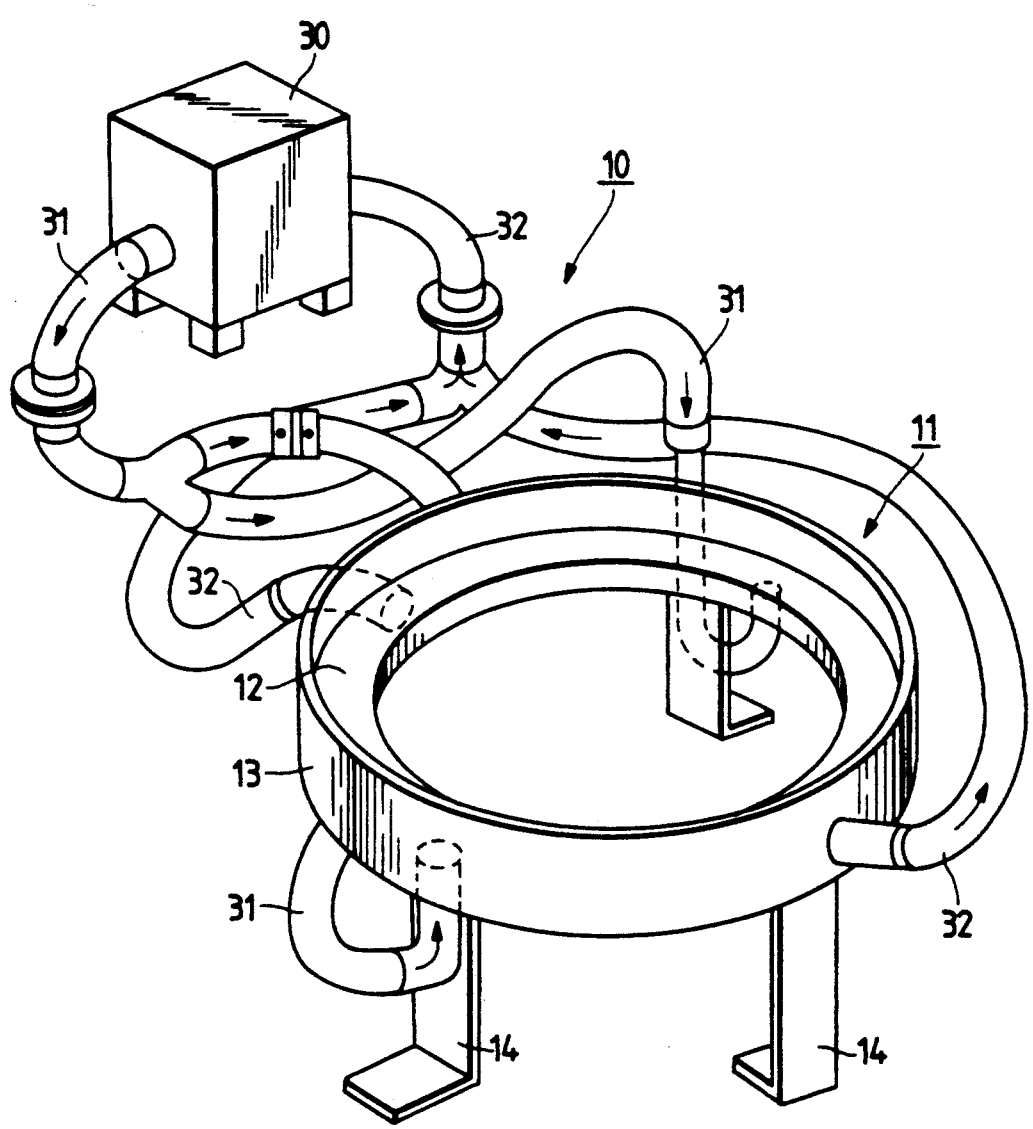
FIG. 1 is a perspective view of the heating system of a magnetic disk manufacturing apparatus constructed in accordance with a preferred embodiment of the present invention.
Figure 2:
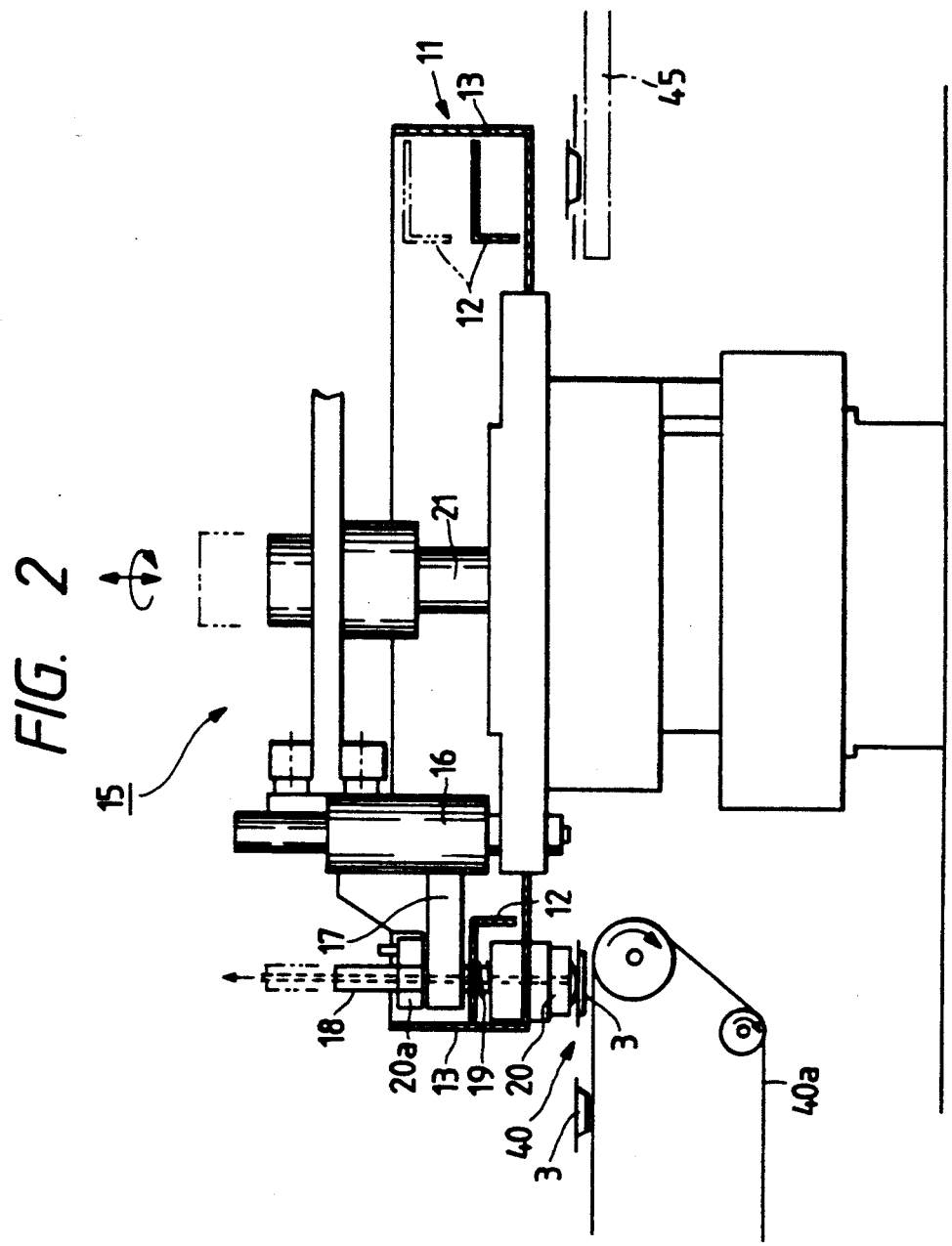
FIG. 2 is a partial sectional side view of the apparatus illustrating the holder and the heat keeper thereof.

FIGS. 1, 2 and 3 illustrate the magnetic disk manufacturing apparatus 10, including a holder 15 which constitutes the central portion of the apparatus and which can be rotated to retrieve the center core 3 and position it. The apparatus 10 also includes an annular heat keeper 11 extending along the peripheral portion of the holder 15, a core feed station 40 for feeding the center core 3, a double-sided adhesive tape feed station 41, an inspection station 42, and an adhering station 43 for adhering the core and the magnetic sheet 4 to each other. These stations are located along the periphery of the heat keeper 11, as shown in FIG. 3.

The heat keeper 11 has a moveable inner portion 12 and a fixed outer portion 13 covering the peripheral portion of the holder 15. Hot air is blown from a hot air source 30 to the heat keeper 11 so that the air flows through the movement passage and back to the generator, as shown in FIG. 1. The fixed outer portion 13 includes a lower horizontal portion having holes disposed at the above-mentioned stations, and an outer vertical portion, in such a manner that its cross section is L-shaped. The fixed outer portion 13 is supported by stanchions 14. The cross section of the movable inner portion 12 is also L-shaped and faces the fixed outer portion 13. The heat keeper 11 has an internal opening surrounded by the inner and the outer portions 12 and 13. The cross section of the opening is substantially rectangularly shaped. Hot air produced by the hot air source 30 and having a desired temperature is sent into the heat keeper 11 at a plurality of positions thereof through hot air feed pipes 31, and thereafter discharged from the keeper to the source through hot air exhaust pipe 32.

The holder 15 includes four heads 16 located at equal intervals around the periphery of the holder, center core retainers 20 coupled to the heads so as to hold the center cores 3, and a rotary center shaft 21 about which the heads and the retainers are rotated clockwise (as view from above). The holder also includes support shafts 18 which vertically extend from the retainers 20 through couplers 17 coupling the heads 16 to the retainers. The shafts are supported so that they can be moved in the vertical direction, as best illustrated in FIG. 2. A position restrictor 20a is attached to each support shaft 18 over the coupler 17. The movable inner portion 12 of the heat keeper 11 and a compressed spring 19 for urging the retainers 20 downwardly are attached to the support shaft 18 under the coupler 17. As a result, each of the retainers 20 is capable of holding the center core 3 with appropriate vertical elasticity through vacuum suction by a vacuum suction device connected to the hollow support shaft 18 having a through hole extending to the bottom of the retainers. The suction device and the support shaft 19 can be easily connected to each other through a flexible pipe and rotary joint which is rotatable about the rotary center shaft 21. The vacuum suction device may be either separately provided, or constituted by the exhaust pipe for the hot air source 30 in order to simplify the apparatus and avoid a reduction in the efficiency of heating the adhesive 3c applied to the center core 3.

In operation, a retainer is moved downwardly so as to grasp a core 3. Thereafter, the retainer and the core 3 are moved upwardly so that the core is disposed within the heat keeper 11 between the inner portion 12 and the outer portion 13. Since the flange 3a of the core 3 has a slight downward slope, sucked air leaks to produce a continuous flow of hot air on the core such that the core is effectively heated so as to be maintained at a desired temperature. The adhesive 3c applied to the core 3 can thus be effectively heated.

The core feed station 40 is composed of a conveyor 40a in the same manner as a conventional conveyor. The center core 3 with the adhesive 3c applied thereto and dried to a desired degree is conveyed by the conveyor to the downstream end thereof. The adhering station 43 is located at a position 270 degrees from the core feed station 40, as illustrated in FIG. 3. A sheet feeder 45 intermittently feeds the magnetic sheets 4 at a prescribed interval to the adhering station 43 and positions the sheet at the same rotation orbit as the retainers 20 of the holder 15. Accordingly, the center core 3 with the adhesive 3c applied to the flange 3a of the core is forced onto the sheet under prescribed pressure by the retainers so that the non-flange portion of the core is fitted in the center hole of the sheet. The core 3 and the sheet 4 are thus adhered to each other by the adhesive 3c.

The double-sided adhesive tape feed station 41 is provided with an A ring feeder. This feed station 41 is not used to manufacture the magnetic disk where an adhesive solution is used to secure the core 3 to the sheet in the same manner described above. Moreover, the inspection station 42 is not used during this process. Rather, the double-sided adhesive tape feed station 41 and inspection station 42 are only used to manufacture a magnetic disk with a double-sided adhesive tape in the conventional manner. In that case, the inspection station serves to confirm that the double-sided adhesive tape is accurately fed to the center core.

Thus, since, according to the invention, the temperature of the center core 3 with the adhesive 3c applied thereto is effectively maintained by the heat keeper 11 while the core is conveyed therein, the adhesive does not cool. For that reason, the core 3 and the magnetic sheet 4 are properly adhered to each other by the adhesive. Further, equipment obtained as a result of the improvement of conventional equipment for manufacturing a magnetic disk with a double-sided tape can be reused as a part of the above described apparatus. Furthermore, the apparatus is less complicated than a conventional apparatus.

Although each of the retainers 20 of the holder 15 holds the center core 3 thereon by vacuum suction, the retainers may alternatively be designed to hold the core thereon by a magnetic force. Further, although the holder 15 is rotated clockwise as viewed from above, it may, of course, be rotated counterclockwise. Additionally, although the inner vertical part 12a of the moveable inner portion 12 of the heat keeper 11 extends over the inner horizontal part of the fixed outer portion thereof, the inner vertical part may extend through the inner horizontal part to increase the effect of the temperature maintaining operation of the heat keeper.

A magnetic disk manufacturing apparatus provided in accordance with the present invention includes at least a holder which can be rotated about the center thereof to pick up a center core and position it, a core feed station disposed at the rotational orbit of the retainers of the holder so as to feed the center core, an adhering station disposed along the orbit so as to adhere the core and a magnetic sheet to each other with an adhesive, and an annular heat keeper which covers the movement passage for the retainers of the holder and through which hot air is circulated to effectively keep the center core at a prescribed temperature. For that reason, even if trouble occurs resulting in the stoppage of rotation of the holder to cause the adhesive to cool, the core and the sheet are prevented from being improperly adhered to each other by the adhesive. Further, the apparatus can be also used to adhere the center core and the magnetic sheet to each other using a conventional double-sided adhesive tape. In other words, the apparatus can be used not only to adhere the core and the sheet to each other using an adhesive solution as described above so as to manufacture a magnetic disk at a lower cost, but also the apparatus can be used to adhere the core and the sheet to each other using double-sided adhesive tape so as to manufacture the magnetic disk at a higher speed. Therefore, the range of applicability of the apparatus is greater.

What is claimed is:

1. An apparatus for manufacturing a magnetic disk wherein a center core having an adhesive substance previously applied thereto is adhered to a magnetic sheet, comprising:
   a holder having a center core retaining member extending therefrom for receiving and retaining said center core, said holder being rotatable such that said retaining member rotates about an orbital path;
   a core feed station, disposed along said orbital path, to which said center core having said adhesive applied thereto is fed, said center core being received by said retaining member at said core feed station;
   an adhering station disposed along said orbital path at a position downstream of said core feed station for adhering said center core to said sheet;
   an annular housing substantially surrounding said orbital path; and
   means for circulating hot air through said orbital path defined by said housing to partially dry said adhesive applied to said center core.

2. The apparatus of claim 1 wherein said annular housing comprises:
   a moveable member to which said retaining member is connected so that said moveable member is rotated with said retaining member; and
   a fixed member, said orbital path being defined between said moveable and fixed portions.

3. The apparatus of claim 2, wherein said fixed and moveable members are each L-shaped.

4. The apparatus of claim 2, wherein said fixed member substantially circumscribes said moveable portion.

5. The apparatus of claim 2, further comprising means for movably connecting said retaining member to said moveable member such that said retaining member can be moved vertically with respect to said moveable member.

6. The apparatus of claim 5, further comprising spring means for urging said retaining member downwardly.

7. The apparatus of claim 5, wherein said core feed station is disposed below said fixed member and said fixed member has an opening therein at a position of said core feed station such that said retaining member can be moved vertically downwardly to receive said center core and thereafter moved upwardly to retain said core within said orbital path surrounded by said fixed and moveable portions.

8. The apparatus of claim 1, wherein said holder includes a plurality of center core retaining members extending radially therefrom.

9. The apparatus of claim wherein said retaining member includes suction means for applying a vacuum thereto to enable said retaining member to retain said core.

10. The apparatus of claim 9, wherein said circulating means includes supplying means for supplying hot air to said orbital path and exhaust means for exhausting air from said orbital path.

11. The apparatus of claim 10, wherein said suction means is connected to said exhaust means.

12. The apparatus of claim 1, further comprising a double-sided adhesive tape feed station disposed along said orbital path for feeding a center core having a double-sided adhesive tape applied thereto to said retaining member.

13. The apparatus of claim 12, further comprising an inspection station for inspecting the application of said tape to said center core.

14. An apparatus for manufacturing a magnetic disk wherein a center core having an adhesive substance previously applied thereto is adhered to a magnetic sheet, comprising:
   a holder having a plurality of arms extending therefrom, each of said arms having a center core retaining member for receiving and retaining said center core, said holder being rotatable such that said retaining members rotate about a 36 degree orbital path;
   an annular housing substantially surrounding said orbital path;
   means for circulating hot air through said orbital path defined by said housing to partially dry said adhesive applied to said center core;
   a plurality of processing stations disposed along said orbital path, wherein the number of said processing stations corresponds to the number of said arms and said processing stations simultaneously process a plurality of center cores, said processing stations comprising at least:
   a core feed station, to which said center core having said adhesive applied thereto is fed, said center core being received by said retaining member at said core feed station; and
   an adhering station at a position downstream of said core feed station for adhering said center core to said sheet.

15. The apparatus of claim 14 wherein said annular housing comprises:
   a moveable member to which said retaining members are connected so that said moveable member is rotated 360 degrees with respect to said retaining members; and
   a fixed member, said orbital path being defined between said moveable and fixed portions.

* * * * *